INVENTOR.
ROY G. PEARSON

United States Patent Office 3,561,053
Patented Feb. 9, 1971

3,561,053
EXTRUSION DEVICE
Roy Gerald Pearson, Toledo, Ohio, assignor to Owens-Illinois, Inc., a corporation of Ohio
Filed May 15, 1967, Ser. No. 638,490
Int. Cl. B29d 23/04
U.S. Cl. 18—14
1 Claim

ABSTRACT OF THE DISCLOSURE

An extrusion head is provided for distributing heat sensitive thermoplastic material to a plurality of outlet orifices. An inlet passage branches symmetrically to a plurality of outlet passages which communicate with the respective outlet orifices. The flow path from the inlet orifice to any of the outlet orifices is substantially equal. Balancing of flow through the respective outlet orifices is achieved solely by the design of the passageway network and temperature control of the thermoplastic material provided by heating elements at the outlet orifices.

In the processing of heat sensitive thermoplastic materials, it is necessary to avoid subjecting such materials to plasticizing temperatures for excessive periods of time. The reason for this is that these materials are readily subject to thermal degradation when heated to plasticizing temperatures for appreciable lengths of time. Such degradation can result in contamination of the material and in undesirable streaking of articles produced therefrom. Polyvinyl chloride in particular is a material which is extremely susceptible to thermal degradation.

In a pending U.S. patent application, assigned to the assignee of the present application, Ser. No. 314,126, filed Oct. 7, 1963, in the names of James E. Heider and Charles E. Plymale, there is disclosed an extruder and an extrusion head or orifice block for handling heat sensitive thermoplastic material. Such apparatus is capable of extruding only a single tube of thermoplastic material. In order to obtain greater productivity in terms of material suitable for blow molding or other uses, it is desirable to supply the heated and plasticized tubing from a plurality of orifices.

Accordingly, it is an object of the present invention to provide an extrusion die which is designed to carry heated thermoplastic material from an extruder where it is heated and plasticized to a plurality of outlet orifices from which it is expelled in the form of tubing or other desired shapes.

Furthermore, it is an object of the present invention to provide an extrusion die through which plasticized thermoplastic material can be extruded without hanging up or becoming otherwise entrapped for excessive periods of time.

Finally, it is an object of the present invention to provide an extrusion die meeting the foregoing requirements along with the added feature that the amount of thermoplastic material extruded from one outlet orifice is substantially equal to that extruded from each of the other outlet orifices.

Under the present invention, the feature of equalizing or balancing the flow of plasticized material through the respective outlet orifices is accomplished solely through the extrusion head design coupled with temperature control of the thermoplastic material without the use of mechanical flow control devices.

Prior to the present invention, it was not possible to provide an economical extrusion head capable of extruding a plurality of tubes or rods of plasticized material through a single extrusion head connected to a single source of plasticized material without the use of valves or other mechanical flow control devices which add to the cost of the extrusion head on the one hand and provide a place for entrapment and resulting thermal degradation of heat sensitive thermoplastic material on the other hand.

Other objects and advantages of the present invention will become readily apparent to those skilled in the art from the following detailed description taken in conjunction with the annexed sheets of drawings on which:

Figure 2:
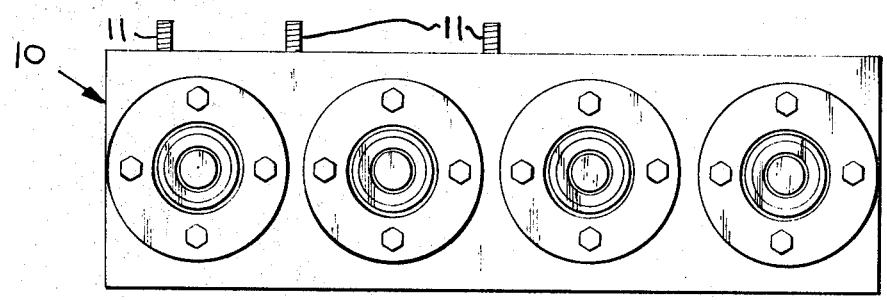
FIG. 2 is a top plan view of the assembled extrusion head of FIG. 1.
Figure 1:
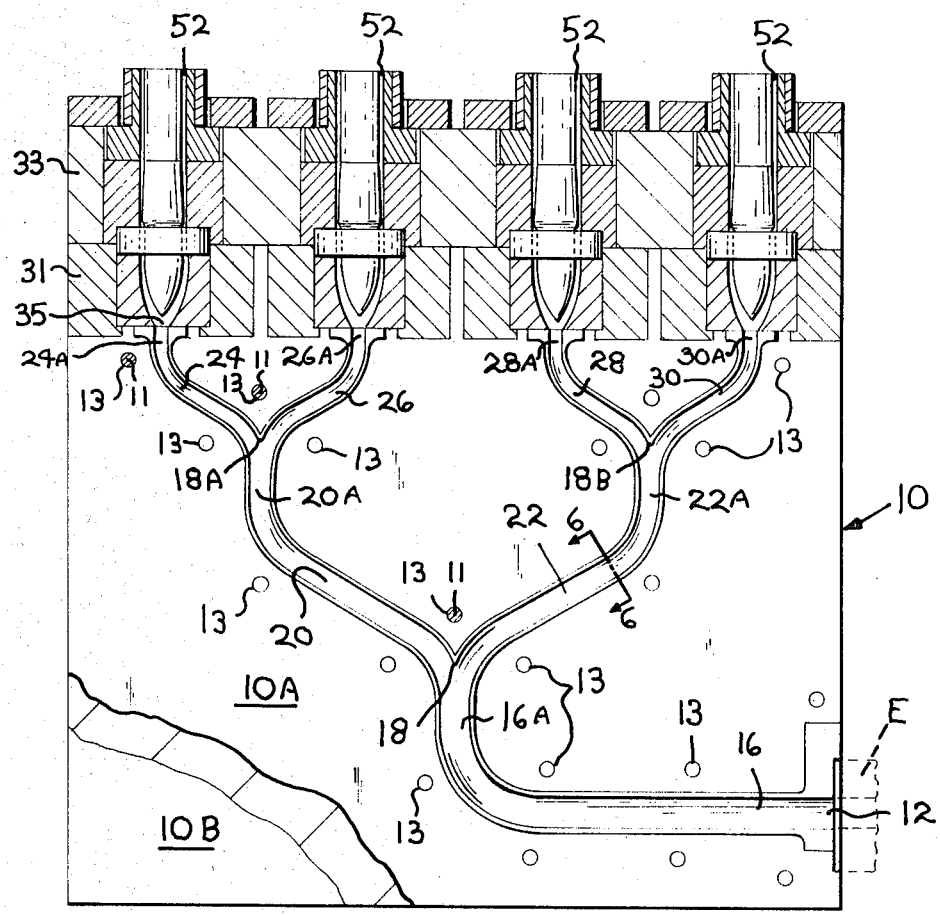
FIG. 1 is an elevational view partly in section showing one-half of an extrusion head formed according to one embodiment of the present invention.

Referring now to the drawings, there is provided an extrusion head generally designated by the numeral 10 comprising a pair of halves 10A and 10B secured together by any desired means, such as bolts 11 extending through bores 13 in the half 10A and engaging internally threaded bores in the half 10B.

Figure 7:
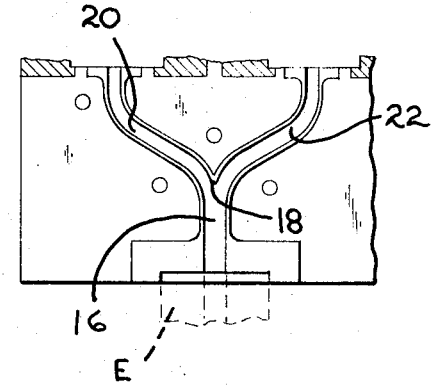
FIG. 7 is a view similar to FIG. 1 showing a modified embodiment.

The extrusion head 10 includes an inlet orifice 12 at the inlet end and a plurality of orifice heads 14 at the outlet end. The inlet orifice 12 receives thermoplastic material from an extruder E and delivers it to a passageway 16 having an upturned leg 16A which separates at a point of separation 18 to form two passageways 20 and 22. The change in direction between passageway 16 and its upturned leg 16A is solely for reasons for convenience in connecting the extrusion head to the extruder E or other source of plasticized material. Thus, as illustrated in FIG. 7, the passageway 16 can follow a straight line element from the inlet orifice to the point of separation 18. The passageways 20 and 22 are equal in diameter and are directed away from the upturned leg 16A at equal angles. Thus, the branches 20 and 22 are symmetrical with respect to a line passing through the upturned leg 16A and through the point of separation 18. The symmetrical design is necessary to insure that an equal amount of thermoplastic material flows to the two branch passageways 20 and 22. The branch passageways 20 and 22 both curve and have vertically disposed legs 20A and 22A, respectively.

The branch passageway 20 subsequently is divided at a point of separation 18A into two additional passageways 24 and 26 while the other branch passageway is divided at a point of separation 18B into two a additional branch passageways 28 and 30. The branches 24 and 26 are symmetrical about a line taken through leg 20A and separation point 18A and the branches 28 and 30 are symmetrical about a line taken through legs 22A and separation point 18B. Finally, each of the branches 24, 26, 28 and 30 curve and have vertically disposed legs 24A, 26A, 28A and 30A, respectively.

It should be noted that the passageways in the extrusion head 10 are formed with streamlined, sweeping curves and that there are no sharp turns or corners in which heated thermoplastic material could become entrapped causing the degradation problems of heat sensitive materials previously noted. Additionally, the cross sectional area for any passageway is substantially equal to the sum of the cross sectional area of its two branches. Thus, for example, the cross sectional area of the passageway 16 is substantially equal to the cross sectional area of the branch passageway 20 plus the cross sectional area of the branch passageway 22.

In view of the fact that the passageways are formed with streamlined, curving elements and no sharp corners, it is necessary that the extrusion head be formed in two sections, 10A and 10B, which are joined together after the network of passageways are formed therein. As previously noted, the sections or halves 10A and 10B of the extrusion head are joined together by any desired means, as by bolts 11.

Figure 3:
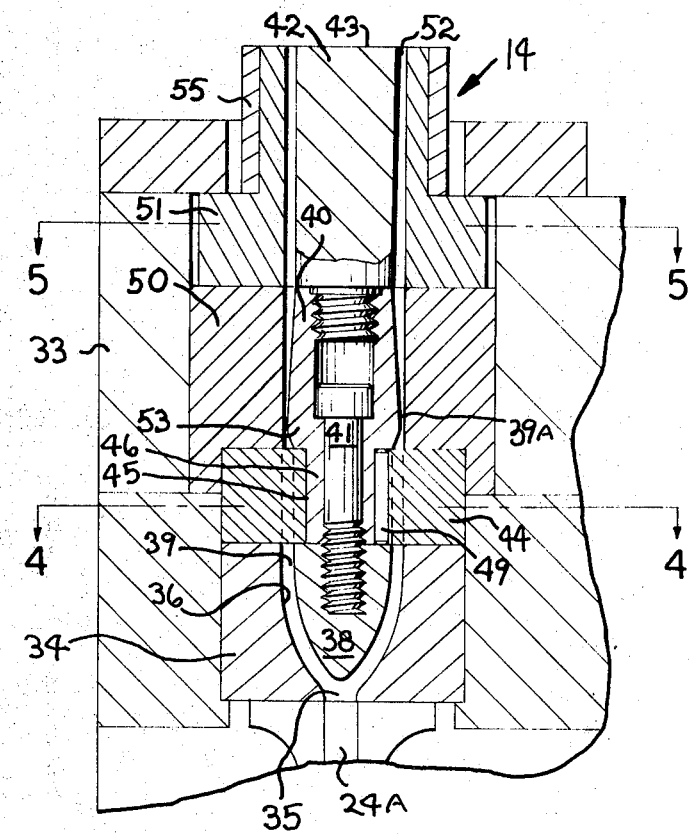
FIG. 3 is an enlarged sectional view of one of the orifice head structures illustrated in FIG. 1.

Referring now to FIG. 3, there is illustrated an enlarged sectional view of a single orifice head 14 retained in support blocks 31 and 33. The orifice head 14 includes a divider housing 34 having at its lower end an opening 35 corresponding in size to the passageway 24A with which it communicates. The housing 34 is received in support block 31 and has a central bore 36 which flares outwardly from the opening 35. Received in the bore 36 is a divider or torpedo 38 which is maintained in spaced relationship with the wall of the bore 36 and cooperates therewith to provide an annular passageway 39 for the flow of plasticized thermoplastic material.

The divider or torpedo 38 is supported in the bore 36 of the housing 34 by means of a mandrel 40, being secured to the mandrel by means of a cap screw 41. Threadedly engaged to the mandrel 40 is a mandrel tip 42 having a free end 43.

Figure 4:
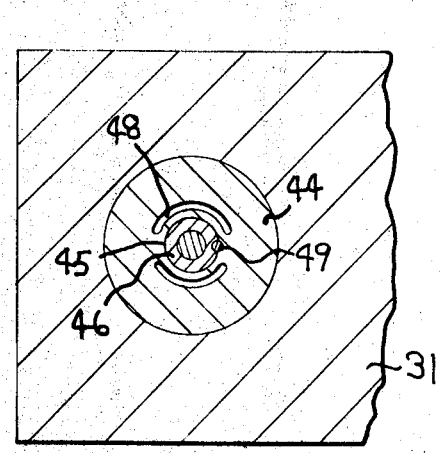
FIG. 4 is a sectional view taken through the line 4—4 of FIG. 3.

The mandrel 40 is retained in the orifice head by means of a mandrel flange 44 (see FIGS. 3 and 4) positioned in a bore of support block 33. The mandrel flange 44 has a bore 45 sized to snugly receive a reduced cylindrical segment 46 of the mandrel 40. The mandrel flange 44 is provided with a pair of arcuate passageways 48 which are aligned with the annular passageway 39. A dowel 49 is positioned in aligned grooves formed respectively in the cylindrical segment 46 and the wall forming the bore 45. The dowel 49 functions to prevent the mandrel 40 from rotating. Positioned above the mandrel flange 44 is a housing 50 and a collar 51, each having a bore with cooperates with the mandrel 40 and the mandrel tip 42, respectively, to define the remainder of the annular passageway 39. The passageway 39 terminates at its upper end in an annular outlet orifice 52.

Figure 5:
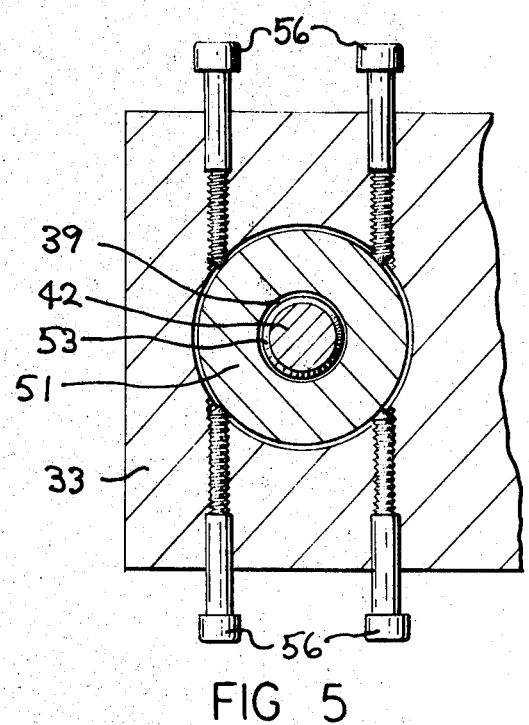
FIG. 5 is a sectional view taken through line 5—5 of FIG. 3.

Referring to FIG. 5, the collar 51 is secured to the support block 33 by a plurality of cap screws 56 threadedly engaged in bores thereof. It can be seen that the screws can be adjusted to center the collar 51 with respect to the mandrel tip 42 to insure that the passageway 39 is uniform in cross section.

The mandrel 40 is provided with an enlarged segment 53 which serves to reduce the size of the annular passageway 39 in the area 39A aligned therewith. Inasmuch as no valving or other flow control devices are provided, the enlarged segment 53 forming the reduced passageway serves to function as a flow restriction to retard drooling of thermoplastic material at times when no positive pressure is being placed upon the thermoplastic material to expel it from the orifice 52. The use of such flow restriction in combination with a reciprocating screw extruder is described and claimed in United States patent application Ser. No. 314,126, filed Oct. 7, 1963 in the names of James E. Heider and Charles E. Plymale, assignors to the assignee of the present application. Additionally, the enlarged segment 53 serves to pressurize the melt system immediately above the mandrel flange 44 thereby minimizing the weld line created as the material is rejoined after passing through the arcuate passageways 48.

Encircling the upstanding wall of the collar 51 is an annular band heater 55 which serves to control the temperature of the material leaving the orifice 52. If desired, additional heating elements may be positioned elsewhere in the extrusion head, for example in the mandrel tip 42.

It will be recognized that because of the symmetrical configuration of the passageways through the extrusion head 10 there theoretically should be an equal amount of material flowing from each of the respective orifices 52. However, experience has shown that slight differences in the flow characteristics of the material passing through the respective passageways may be encountered. Such differences may be caused by numerous factors including variations in the surface characteristics of the respective passageways causing a difference in the coefficients of friction between the plastic material and the walls of the respective passageways. Although this difference is very small, it can have an effect on the amount of material flowing from a given passageway. These differences can be compensated by means of the band heaters 55 increasing or decreasing the temperature at one or more of the outlet orifices 52 as may be needed to increase or decrease the flow of material from such orifice and thereby cause the flow of material from all the orifices to balance. Experience has shown that for some materials, polyvinyl chloride, for example, selective use of the heaters is needed to achieve a balanced flow of material from the respective outlet orifices 52 but that for other materials, high density polyethylene, for example, a balanced flow of material can be achieved without the use of variable heating.

Figure 6:
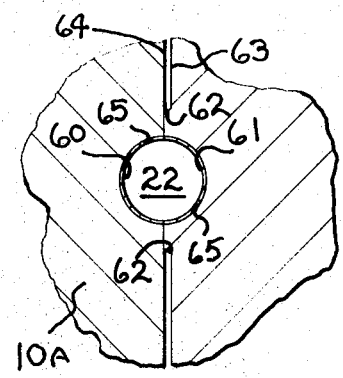
FIG. 6 is a sectional view taken through line 6—6 of FIG. 1 but showing the other half of the extrusion head secured to the half shown in FIG. 1.

Referring now to FIG. 6, there is illustrated a typical section through one of the passageways 22. It will be noted that the half 10A of the extrusion head 10 has formed therein a groove 60 semicircular in cross section. The other half 10B has a corresponding groove 61. The grooves 60 and 61 are provided with a thin coating 65 of highly polished chrome plate. The portion of the half 10B adjacent the groove 61 is built up on opposite sides thereof to provide ridges 62. The ridges 62, extending outwardly from the face 63 of the extrusion head half 10B, engage the face 64 of extrusion head half 10A with the respective grooves 60 and 61 precisely aligned to form the passageway 22.

It will be appreciated that the clamping forces obtained when the respective halves 10A and 10B are bolted together will be concentrated in the relatively small area of contact between ridges 62 and the face 64 thus insuring a leak-proof seal.

In operation, heated thermoplastic material is fed to the inlet orifice 12 from a conventional plasticizer extruder E through the passageway 16 to the separation point 18 where the material is divided with substantially equal amounts flowing to the respective passageways 20 and 22. The material flows through the respective passageways 20 and 22 to the respective separation points 18A and 18B where the material again separates with substantially equal amounts of material flowing from the passageway 20 to each of the branch passageways 24 and 26 and substantially equal amounts flowing from the passageway 22 to each of the branch passageways 28 and 30. From the respective passageways 24, 26, 28 and 30, the heated thermoplastic material flows through the openings 35 and passageways 39 to the outlet orifices 52. If necessary for balanced flow, additional material may be caused to flow through one or more of the outlet orifices 52 by use of the band heaters 55.

The present invention permits heated thermoplastic material to be delivered from a single source to a plurality of outlet orifices in substantially equal quantities thereby permitting a plurality of molding operations to be performed with the use of a single extruder. The fact that it is able to do so without the use of valves or other mechanical flow control devices which would serve to entrap plasticized material makes it ideally suited for processing heat sensitive thermoplastic materials such as polyvinyl chloride.

Numerous modifications will become readily apparent to those skilled in the art. Accordingly, it is not the intention to limit the scope of the present invention except as required by the appended claim.

I claim:

1. An extrusion head comprising first and second halves, joined together, said halves having mating faces maintained in opposed facing relationship, each of said faces having at least one groove formed therein, the grooves of the respective halves being aligned and cooperating to define a passageway through which flowable material can pass, the mating face of at least one of said halves being provided with ridges on opposite sides of grooves formed therein, said ridges extending outwardly from the surface of said face and forming a part of said passageway and sealingly engaging said other half on opposite sides of grooves formed in the mating face thereof, said ridges having a small area relative to the area of the mating faces to concentrate the clamping forces at said ridges thus insuring a leak-proof seal.

References Cited

UNITED STATES PATENTS

| | | | |
|---|---|---|---|
| 278,667 | 5/1883 | Olszewski | 18—14P |
| 2,734,224 | 2/1956 | Winstead | 18—12DS |
| 2,859,476 | 11/1958 | Lainson | 18—14P |
| 2,978,748 | 4/1961 | McCauley et al. | 18—14S |
| 3,416,190 | 12/1968 | Mehnert | 18—14G |
| 2,508,988 | 5/1950 | Bradley | 18—12(SJ)X |
| 2,760,046 | 8/1956 | Rothacker | 18—12(SJ)X |
| 3,357,050 | 12/1967 | Criss | 18—12(SJ)UX |
| 3,399,428 | 9/1968 | Valyi | 18—30(RM) |

J. SPENCER OVERHOLSER, Primary Examiner